US008167269B2

(12) United States Patent
Bell et al.

(10) Patent No.: US 8,167,269 B2
(45) Date of Patent: May 1, 2012

(54) VALVE TRIM APPARATUS FOR USE WITH VALVES

(75) Inventors: Brandon Wayne Bell, Marshalltown, IA (US); Leslie E. Fleming, Marshalltown, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 175 days.

(21) Appl. No.: 12/474,003

(22) Filed: May 28, 2009

(65) Prior Publication Data

US 2010/0301240 A1 Dec. 2, 2010

(51) Int. Cl.
*F16K 1/00* (2006.01)
*F16K 15/00* (2006.01)

(52) U.S. Cl. .................................. 251/325; 251/333

(58) Field of Classification Search .................. 251/318, 251/333, 334, 325
See application file for complete search history.

(56) References Cited

U.S. PATENT DOCUMENTS

| | | | |
|---|---|---|---|
| 3,813,079 A | | 5/1974 | Baumann et al. |
| 3,960,364 A | * | 6/1976 | Hargrave ..................... 251/210 |
| 3,964,516 A | | 6/1976 | Purton et al. |
| 4,011,287 A | | 3/1977 | Marley |
| 4,658,847 A | * | 4/1987 | McCrone ..................... 137/72 |
| 5,236,014 A | | 8/1993 | Buls et al. |
| 6,840,520 B2 | | 1/2005 | Faas et al. |
| 6,851,658 B2 | | 2/2005 | Fitzgerald et al. |
| 6,974,121 B2 | * | 12/2005 | Koester et al. ................ 251/174 |
| 7,373,951 B2 | | 5/2008 | Gossett et al. |
| 7,448,409 B2 | | 11/2008 | Micheel et al. |
| 7,681,594 B2 | * | 3/2010 | Gossett et al. ........... 137/625.37 |
| 2003/0197144 A1 | | 10/2003 | Nguyen |
| 2004/0011986 A1 | | 1/2004 | Faramarzi |

FOREIGN PATENT DOCUMENTS

| | | |
|---|---|---|
| JP | 60146966 | 8/1985 |
| WO | 2009088632 | 7/2009 |
| WO | 2009088633 | 7/2009 |

OTHER PUBLICATIONS

Saint-Gobain Performance Plastics, "OmniSeal® 103A Face Seal," Product Bulletin for 103A Face Seal, retrieved from www.seals.saint-gobain.com on Mar. 6, 2009 (2 pages).
Saint-Gobain Performance Plastics, "OmniSeal® 400A Series," Product Bulletin for 400A Series, retrieved from www.seals.saint-gobain.com on Mar. 6, 2009 (2 pages).
Saint-Gobain Performance Plastics, "How OmniSeals Work," Operation Instruction for OmniSeals, retrieved from www.seals.saint-gobain.com (1 page).
Saint-Gobain Performance Plastics, "Face Seal Hardware Design," Operation Instruction for OmniSeals, retrieved from www.seals.saint-gobain.com (1 page).

(Continued)

*Primary Examiner* — John Fristoe, Jr.
(74) *Attorney, Agent, or Firm* — Hanley, Flight & Zimmerman, LLC (57) ABSTRACT

A valve trim apparatus for use with valves is described. An example valve trim apparatus includes a cage having an upper portion removably coupled to a lower portion. A closure member is disposed within the cage and has a first seating surface and a second seating surface. A seal assembly is fixed between the upper and lower portions of the cage. The first sealing surface of the closure member sealingly engages the seal assembly when the closure member is in a closed position to prevent leakage between the closure member and the cage.

17 Claims, 5 Drawing Sheets

OTHER PUBLICATIONS

Saint-Gobain Performance Plastics, "Temperature, Pressure and Extrusion Gap," Operation Instruction for OmniSeals, retrieved from www.seals.saint-gobain.com (1 page).

Saint-Gobain Performance Plastics, "Friction and Rotary Motion," Operation Instruction for OmniSeals, retrieved from www.seals.saint-gobain.com (1 page).

Saint-Gobain Performance Plastics, "Seal Function and Motion," Operation Instruction for OmniSeals, retrieved from www.seals.saint-gobain.com (1 page).

Emerson Process Management, "easy-e® Cryogenic Sliding-Stem Control Valves," Product Bulletin for 51.1: easy-e Cyrogenic Valves, www.emersonprocess.com, Feb. 2007 (22 pages).

International Searching Authority, "International Search Report," issued in connection with international application serial No. PCT/US2010/031682, mailed Jul. 27, 2010, 5 pages.

International Searching Authority, "Written Opinion of the International Searching Authority," issued in connection with international application serial No. PCT/US2010/031682, mailed Jul. 27, 2010, 6 pages.

* cited by examiner

VALVE TRIM APPARATUS FOR USE WITH VALVES

FIELD OF THE DISCLOSURE

This disclosure relates generally to valves and, more particularly, to valve trim apparatus for use with valves.

BACKGROUND

Valves are commonly used in process control systems to control the flow of process fluids. Sliding stem valves (e.g., a gate valve, a globe valve, a diaphragm valve, a pinch valve, etc.) typically have a closure member (e.g., a valve plug) disposed in a fluid path. A valve stem operatively couples the closure member to an actuator that moves the closure member between an open position and a closed position to allow or restrict the flow of fluid between an inlet and an outlet of the valve. Additionally, to provide desired and/or to achieve certain flow characteristics of the fluid, valves often employ a cage that interposes in the fluid path between the inlet and the outlet of the valve. A cage can reduce flow capacity, attenuate noise, and/or reduce or eliminate cavitation. Additionally, a cage typically surrounds the closure member to provide stability, balance, and alignment to the closure member.

However, unwanted leakage may occur between the closure member and the cage if a proper seal is not employed. Such unwanted leakage may affect the shut-off classification of a valve. For example, the American National Standards Institute has established various leakage classifications (e.g., Class I, II, III, etc.) relating to the amount of fluid allowed to pass through a valve when the valve is in a closed position.

To provide a seal between a cage and a closure member, the closure member typically includes a channel or groove that receives a seal and/or piston ring that engages an inner surface of the cage. The inner surface of the cage often includes a surface finish to provide a sealing surface for the seal and/or piston ring when engaged to the inner surface of the cage. However, such a surface finish increases manufacturing complexity and, thus, increases costs. Typically, the size of the valve and industrial process conditions such as pressure and temperature (e.g., temperatures greater than 600° F.) of the process fluids are used to determine the type of valve and valve components that may be used such as, for example, the types of seals that may be used to effect a seal between a cage and a closure member.

Additionally or alternatively, the pressure differential of the fluid between the inlet and the outlet of the valve may be used to pressure assist or load the seals against a sealing surface (i.e., the walls formed by the groove of the closure member) to effect a seal between the cage and the closure member. However, during low pressure applications, fluid pressure may be insufficient to adequately pressure assist the seal against the sealing surface, thereby causing undesired leakage through the valve.

SUMMARY

An example valve trim assembly for use with valves described herein includes a cage having an upper portion removably coupled to a lower portion. A closure member is disposed within the cage and has a first seating surface and a second seating surface. A seal assembly is fixed between the upper and lower portions of the cage. The first sealing surface of the closure member sealingly engages the seal assembly when the closure member is in a closed position to prevent leakage between the closure member and the cage.

In another example, a valve trim assembly described herein includes means for characterizing a fluid flow through a valve having an upper portion removably coupled to a lower portion. The assembly further includes means for controlling the fluid flow through the valve disposed within the means for characterizing. A first portion of the means for controlling is sized to fit closely within the first portion of the means for characterizing and a second portion is sized to fit closely within the second portion of the means for characterizing. The means for controlling moves between an open position to allow fluid flow through the valve and a closed position to prevent fluid flow through the valve. The assembly also includes means for sealing disposed between the upper portion and the lower portion of the means for characterizing. At least a portion of the means for controlling engages the means for sealing to prevent leakage between the means for characterizing and the means for controlling when the means for controlling is at a closed position.

DETAILED DESCRIPTION

The example valve trim apparatus or assemblies described herein may be used with valves having a sliding stem such as, for example, control valves, throttling valves, etc. In general, the example valve trim apparatus described herein may be used to provide a seal to substantially prevent fluid leakage between a sealing surface or a cage and a closure member (e.g., a valve plug) of a valve. In particular, an example valve trim apparatus described herein includes a closure member having an enlarged sealing portion or seating surface (e.g., a head portion having a relatively larger diameter than a body portion of the closure member). The example valve trim apparatus may further include a cage having a first portion removably coupled to a second portion. In one example, the first and second cage portions may capture a seal assembly therebetween so that the enlarged sealing portion of the closure member engages the seal assembly when the valve is in a closed position.

In another example, the first and second cage portions may capture a valve seat therebetween to engage the enlarged sealing portion or seating surface of the closure member when the valve is in the closed position. Additionally, in this example configuration, the seal assembly of the valve trim apparatus does not include a seal (e.g., a C-seal) that relies on a pressure differential of the process fluid to pressure assist the seal against a sealing surface. Instead, in this example, the valve trim apparatus employs a secondary valve seat to provide a tight seal between the cage and the closure member when the valve is in the closed position.

In general, the example valve trim apparatus described herein prevent leakage between the closure member and the cage when the valve is in a closed position to improve a shut-off classification of the valve. For example, the example valve trim apparatus described herein can provide class V or better shut-off capability per the American National Standards Institute classification system at process fluid temperatures greater than 600° F. Additionally or alternatively, disposing a seal and/or a secondary valve seat between the first and second portions of a cage eliminates the need to include seals in the closure member, thereby reducing the complexity and cost of the closure member.

Figure 1A:
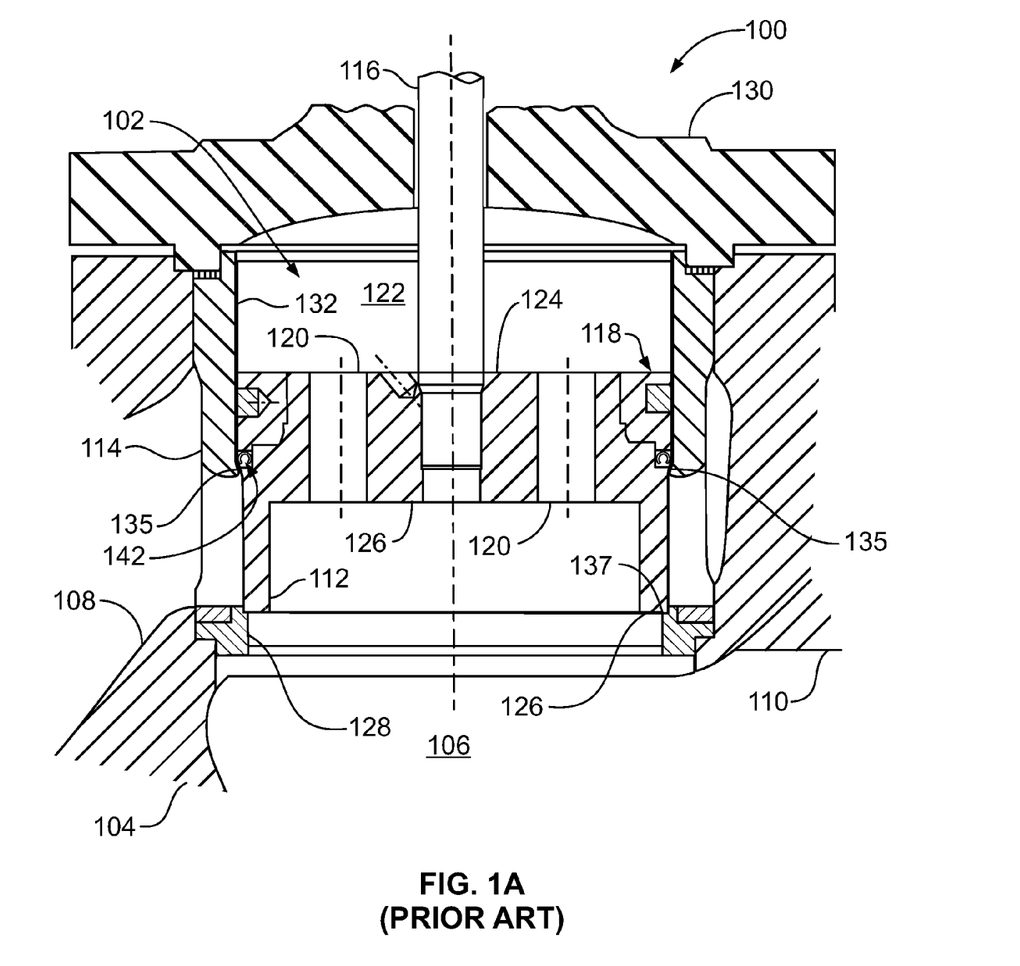
FIG. 1A is a cross-sectional view of a portion of a known valve implemented with a known valve trim apparatus.

FIG. 1 illustrates a cross-sectional view of a portion of a known valve 100 having a known valve trim assembly 102. The valve 100 illustrated in FIG. 1 includes a valve body 104 that defines a fluid flow passageway 106 between an inlet 108 and an outlet 110. The valve trim assembly 102 is interposed in the fluid flow passageway 106 between the inlet 108 and the outlet 110.

In this example, the valve trim assembly 102 includes a valve plug 112, a cage 114, a valve stem 116, and a seal assembly 118 that is coupled to the valve plug 112. As depicted, the valve plug 112 includes channels or conduits 120 to balance the pressures acting across the valve plug 112. Thus, the forces exerted across the valve plug 112 by the pressure of the process fluid flowing through the valve 100 are substantially equalized. For example, the pressure of the fluid in a cavity 122 exerts a force on a first side or surface 124 of the valve plug 112 that is approximately equal to and opposite a force exerted on a second side or surface 126 of the valve plug 112. As a result, a smaller actuating force can be provided to move the valve plug 112 between the open and closed positions.

The valve plug 112 is slidably disposed within the cage 114 and moves between an open position and a closed position to control the fluid flow rate through the valve 100. The valve stem 116 couples the valve plug 112 to an actuator (not shown), which moves the valve plug 112 toward and away from a valve seat 128. A bonnet 130 is coupled to the valve body 104 (e.g., via fasteners) which, in turn, couples the valve body 104 to the actuator.

Figure 1B:
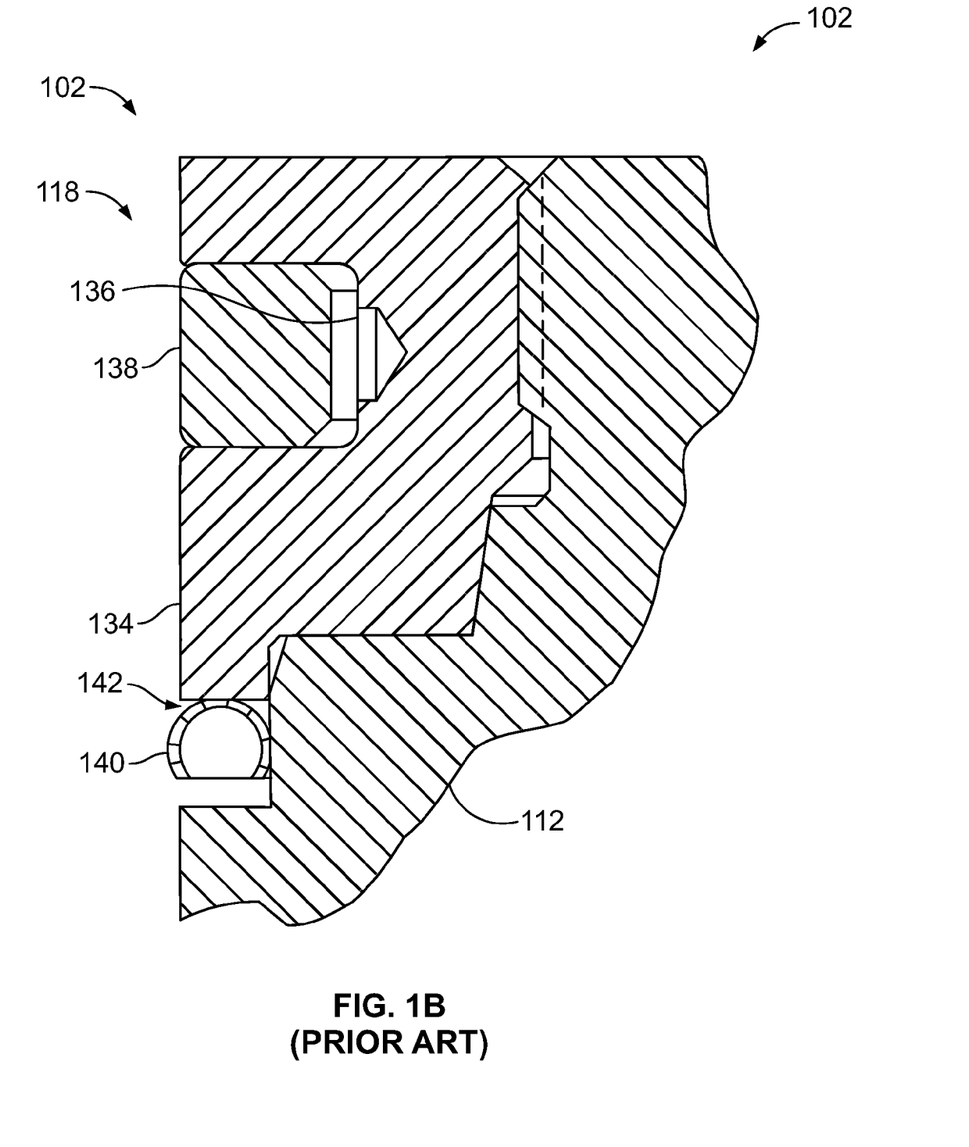
FIG. 1B is an enlarged portion of the known valve of FIG. 1A.

The seal assembly 118 engages an inner surface or bore 132 of the cage 114 to prevent fluid leakage between the valve plug 112 and the cage 114 when the valve 100 is in the closed position (i.e., when the valve plug 112 sealingly engages the valve seat 128 as shown in FIG. 1). As most clearly shown in FIG. 1B, the seal assembly 118 includes a retainer 134 coupled to the valve plug 112 via a fastener (not shown). The retainer 134 includes a gland or annular groove 136 to receive a piston ring 138, which minimizes leakage between the cage 114 and the valve plug 112 while the valve plug 112 is throttling fluid flow through the valve 100 (i.e., moving between the open and closed positions). The retainer 134 also captures a seal 140 (e.g., a C-seal) between the retainer 134 and the valve plug 112. The seal 140 engages a lip portion 135 of the cage 114 when the valve plug 112 is in the closed position. The seal 140 does not engage the inner surface 132 of the cage 114 when the valve plug 112 is throttling fluid flow through the valve 100. Thus, the valve plug 112, the retainer assembly 118, the cage 114 and/or the seat 128 are manufactured with precise (e.g., tight) tolerances so that the seal 140 sealingly engages the lip portion 135 and an end 137 of the valve plug 112 sealingly engages the valve seat 128 when the valve 100 is in the closed position.

In operation, the actuator moves the valve plug 112 away from the valve seat 128 to allow fluid flow through the valve 100 (e.g., in the open position) and toward the valve seat 128 to restrict fluid flow through the valve 100. The valve plug 112 sealingly engages the valve seat 128 to prevent fluid flow through the valve 100 (e.g., in the closed position). In the closed position, the valve plug 112 blocks process fluid from passing through the passageway 106 of the valve 100. As a result, the process fluid at the inlet 108 may have a pressure that pushes against the valve plug 112. At the closed position, the seal 140 engages the seating surface 135 of the cage 114 to prevent leakage between valve plug 112 and the cage 114 due to fluid pressure pushing against the valve plug 112. An improper seal between the valve plug 112 and the cage 114 causes fluid at the inlet 108 to leak between the valve plug 112 and the cage 114, and to the outlet 110, thereby substantially affecting the shut-off classification of the valve 100.

As the valve plug 112 moves between the open position and the closed position, the seal 140 does not engage the cage 114. The piston ring 138 traverses along the inner surface 132 of the cage 114 to prevent fluid leakage between the cage 114 and the valve plug 112 to, for example, provide stability to the valve plug 112. Thus, the inner surface 132 of the cage 114 includes a surface finish to provide a proper sealing surface when the piston ring 138 engages the inner surface 132 as the valve plug 112 traverses between the open and closed positions. Additionally or alternatively, to reduce wear, the inner surface 132 of the cage 114 typically includes a hardfacing surface finish. However, such surface finishes increase manufacturing costs.

In high-temperature applications (e.g., greater than 600° F.), seals or piston rings made of elastomeric materials typically cannot be used due to their lack of resistance to high temperatures. Thus, an increase in operating temperature may permanently deform or damage an elastomeric seal (e.g., the seal 140) or piston ring, thereby creating undesired leakage between the cage 114 and the valve plug 112. In such high temperature applications, piston rings are typically employed. More specifically, for example, in some high-temperature applications, because of its resistance to high temperature, a carbon-graphite piston ring may be used to provide a seal between the cage 114 and the valve plug 112. However, because of its brittle characteristic and lack of elasticity, a carbon-graphite piston ring cannot be installed intact and must be broken into pieces prior to being installed in the gland 136 of the retainer 134, which may cause undesired leakage between the valve plug 112 and the cage 114.

Furthermore, the pressure differential of the fluid between the inlet 108 and the outlet 110 of the valve 100 is used to pressure assist or load the seal 140 against a sealing surface 142 (i.e., against walls of the valve plug 112, the retainer 134 and/or the cage 114) to effect a seal between the cage 114 and the valve plug 112. However, fluid pressure may be insufficient to adequately control seal compression (i.e., compression of the seal) against the sealing surface 142 such as, for example, the seating surface of the cage 114 when the seal 140 sealingly engages the seating surface 135, thereby causing undesired leakage through the valve 100. Precise control of the compression of the seal 140 between the wall of the valve plug 112 and the seating surface 135 of the cage 114 ensures adequate sealing forces exist at all pressure differential conditions. An insufficient or inadequate seal compression control when the seal 140 sealingly engages the seat surface 135 may cause an undesired leakage performance.

Figure 2A:
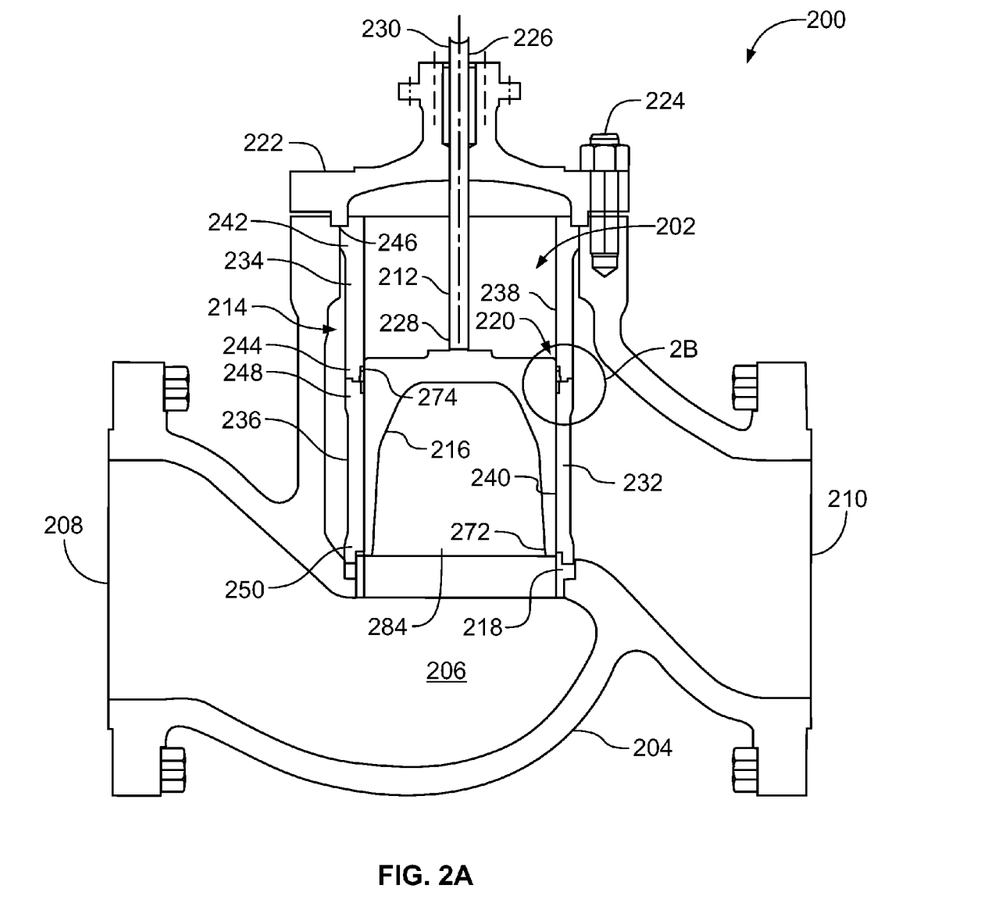
FIG. 2A is a cross-sectional view of a portion of a valve implemented with an example valve trim apparatus described herein.
Figures 2B, 2C, 3:
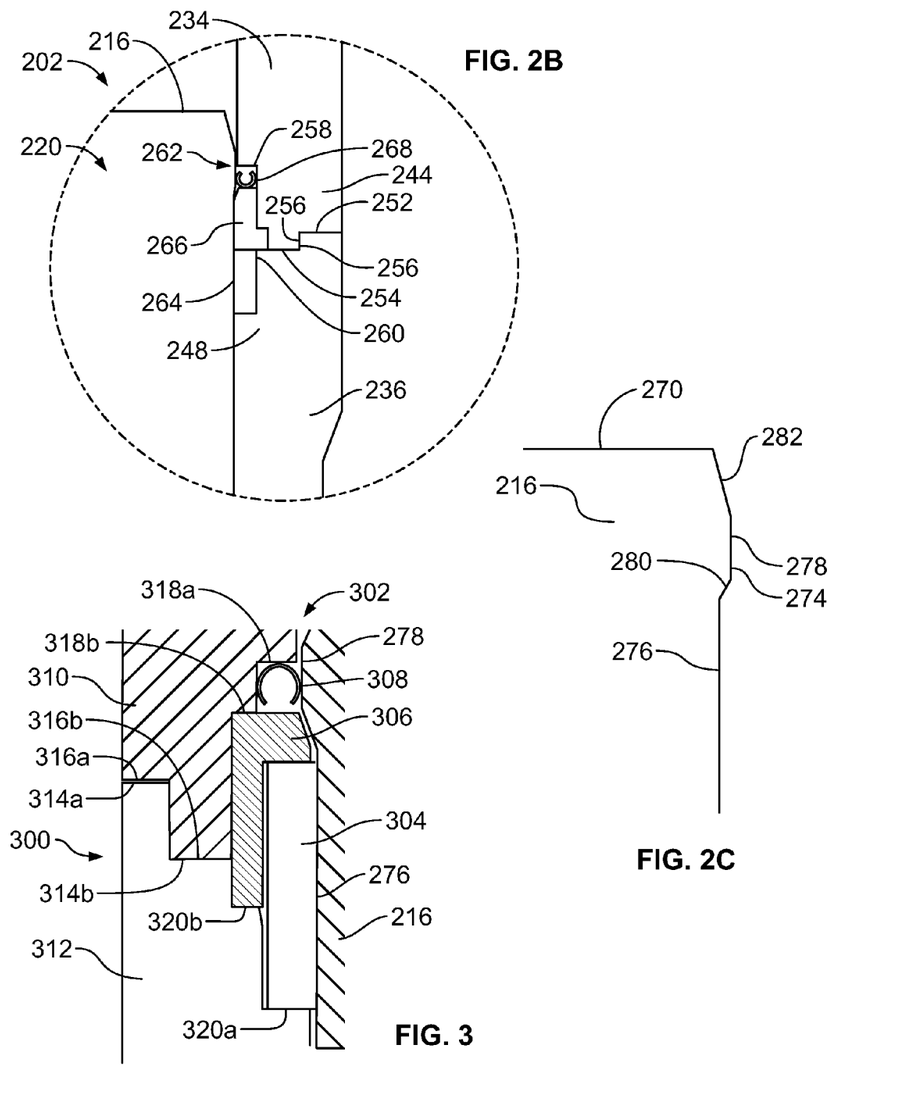
FIG. 2B is an enlarged portion of the example valve trim apparatus of FIG. 2A.
FIG. 2C is an enlarged portion of an example closure member shown in FIGS. 2A and 2B.
FIG. 3 illustrates another example valve trim apparatus described herein.

FIG. 2A illustrates a cross-sectional view of a valve 200 implemented with an example valve trim assembly 202 described herein. FIG. 2B is an enlarged portion of the example valve trim assembly 202 of FIG. 2A. FIG. 2C is an enlarged portion of an example closure member 216 of FIGS. 2A and 2B.

The valve 200 illustrated in FIG. 2 includes a valve body 204 that defines a fluid flow passageway 206 between a first port or inlet 208 and a second port or outlet 210. The valve trim assembly 202 interposes in the fluid flow passageway 206 to control fluid flow between the inlet 208 and the outlet 210. In this example, the valve trim assembly 202 includes a valve stem 212, a cage 214, the closure member 216 (e.g., a valve plug), a valve seat 218 (e.g., a seat ring), and a seal assembly 220. A bonnet 222 is coupled to the valve body 204 via a fastener 224, and the bonnet 222 couples the valve body 204 to an actuator (not shown). Although not shown, the bonnet 222 houses a packing system (e.g., a spring packing), which prevents undesired leakage to the environment via the valve stem 212 as the valve stem 212 moves or slides within the valve 200 along an axis 226. A gasket (not shown) may be disposed between the cage 214 and/or the valve body 204 and the bonnet 222 to prevent unwanted fluid leakage through the valve body 204. In this example, the bonnet 222 is fixed to the valve body 204 to retain (e.g., via an interference and/or press fit) the cage 214 and the valve seat 218 within the valve body 204. In other examples, the valve seat 218 couples to the cage 214 and/or the valve body 204 via, for example, fasteners, etc.

The valve stem 212 is operatively coupled to the closure member 216 at a first end 228 and extends through the bonnet 222 to couple the closure member 216 to an actuator stem (not shown) at a second end 230. The actuator stem couples the closure member 216 to the actuator.

The cage 214 is disposed between the inlet 208 and the outlet 210 to provide certain fluid flow characteristics (i.e., characterize the flow of fluid) through the valve body 204 (e.g., reduce noise and/or cavitation generated by the flow of fluid through the valve 200). The cage 214 includes at least one opening 232 through which fluid can flow when the valve 200 is in an open position (i.e., when the closure member 216 is spaced away from the valve seat 218).

The cage 214 can be configured in different manners to provide certain fluid flow characteristics (characterize the fluid flow) to suit the needs of a particular control application. For example, the opening 232 may be designed or configured to provide particular, desirable fluid flow characteristics of the fluid such as, for example, to reduce noise and/or cavitation, to enhance pressure reductions of the process fluid, etc. The desired fluid flow characteristics are achieved by varying the geometry of the opening 232. In some examples, the cage 214 may include a plurality of openings having various shapes, sizes, and/or spacing(s) to control the flow, reduce cavitation, and/or reduce noise through the valve 200.

The cage 214 guides the closure member 216 and provides lateral stability as the closure member 216 travels between the open position and the closed position, thereby reducing vibrations and other mechanical stress. The cage 214 can also facilitate maintenance, removal, and/or replacement of the other components of the valve trim assembly 202. In the illustrated example, the cage 214 is a two-piece structure that includes an upper cage portion 234 (e.g., a cage retainer) that removably couples to a lower cage portion 236 (e.g., a flow control element). In this example, the upper cage portion 234 includes a bore 238 that is sized larger (i.e., has a larger diameter) than a bore 240 of the lower cage portion 236.

The upper cage portion 234 may be made of a first material (e.g., a steel alloy) and the lower cage portion 236 may be made of a second material (e.g., a stainless steel) different from the first material. This may be particularly advantageous in severe service applications (e.g., high temperature applications, corrosive applications), which may require more expensive resilient materials (e.g., corrosion resistant, etc.) and, thus, may reduce manufacturing costs by enabling the upper cage portion 234, to be made of a lower cost material. In other examples, for example in high temperature applications, the upper cage portion 234 may be made of the same material as the material of the valve body 204 to minimize or substantially reduce linear thermal expansion (e.g., linear stack-up) of the cage 214 relative to the valve body 204. In yet other examples, the upper cage portion 234 and the lower cage portion 236 may be made of the same material.

Additionally or alternatively, because the seal assembly 220 is stationary (i.e., fixed to the cage 214), a surface finish of the inner surface of the bore 238 is not critical and does not require or need a smooth surface (e.g., hardfacing) because the closure member 216 does not engage or seal against the inner surface of the bore 238 (e.g., unlike the piston ring 138 and/or the seal 140 attached to the closure member 112 of the valve 100 of FIGS. 1A and 1B). However, in some examples, the inner surface of the bore 238 may have a surface finish (e.g., hardfacing). Additionally or alternatively, the inner surface of the bore 238 may be formed in accordance with relaxed tolerances and, thus, does not require the degree of dimension control required in many known valves, thereby significantly reducing the complexity and cost of the cage 214. Thus, the example cage 214 and the seal assembly 220 reduces manufacturing costs. Additionally or alternatively, the upper cage portion 234 can be a solid, non-permeable cylinder or structure and the lower cage portion 236 can be a permeable cylinder or structure having at least one opening (e.g., the opening 232).

The upper cage portion 234 includes a first end 242 that engages the bonnet 222 and a second end 244 that engages the lower cage portion 236. The first end 242 of the upper cage portion 234 may include a recessed edge 246 to properly align the cage 214 with the valve body 204. Likewise, the lower cage portion 236 includes a first end 248 that engages the upper cage portion 234 and a second end 250 that engages the valve seat 218. In this example, the cage 214 and the valve seat 218 are captured (e.g., via press fit or interference fit) between the bonnet 222 and the valve body 204.

Referring also to FIG. 2B, in the illustrated example, the upper cage portion 234 includes a first stepped wall portion 252 that matably engages a stepped wall portion 254 of the lower cage portion 236 to form shoulders 256. The shoulders 256 of the stepped wall portions 252 and 254 engage to facilitate alignment and the coupling of the upper and lower cage portions 234 and 236. In other examples, the second end 244 of the upper cage portion 234 and/or the first end 248 of the lower cage portion 236 may include one or more shoulders 256 to facilitate the precise alignment of the upper and lower cage portions 234 and 236 and/or may be dimensioned or have shapes or geometries that result in an interference fit or press fit between the shoulders 256. In yet other examples, a gasket or seal member can be disposed between the upper and lower cage portions 234 and 236 to provide a seal between upper and lower cage portions 234 and 236.

Additionally, the second end 244 of the upper cage portion 234 includes a gland or annular groove 258 (e.g., a stationary gland) and the first end 248 of the lower cage portion 236 includes a gland or annular groove 260 (e.g., a stationary gland). When coupled together, the glands 258 and 260 form a sealing surface 262 of the cage 214 to receive the seal assembly 220, which provides a seal between the cage 214 and the closure member 216.

In the illustrated example, the seal assembly 220 includes a sealing ring 264, a retainer 266, and a seal 268 (e.g., a C-seal). The sealing ring 264 is disposed within the gland 260 of the lower cage portion 236, and the seal 268 and the retainer 266 are disposed within the gland 258 of the upper cage portion 234. The retainer 266 retains the sealing ring 264 and/or the seal 268 in position as the closure member 216 traverses between the closed position and the open position. The retainer 266 is press fit or interference fit with the cage 214 and, thus, does not require threads or other fasteners to couple to the cage 214. The sealing ring 264 minimizes leakage between the cage 214 and the closure member 216 when the closure member 216 is throttling flow through the valve 200. Because the cage 214 is a two-piece structure, the sealing ring 264 may be a carbon-graphite ring that can be installed intact (i.e., without having to break it into pieces). In some example implementations, the seal 268 may be an elastomeric seal or ring, or any other seal made of other suitable material (s) to effect a seal between the cage 214 and the closure member 216. The seal 268 can be in the form of a C-seal or ring. An open portion of the C-seal faces an oncoming fluid flowing through the valve 200 and, thus, can be pressure-assisted to seal against the sealing surface 262 by the pressure of the fluid in the valve 200.

Referring also to FIG. 2C, in the illustrated example, the closure member 216 is depicted as a valve plug (e.g., a balanced valve plug, an unbalanced valve plug, etc.) having a cylindrical body 270 that includes a first seating surface 272 (FIG. 2A) and a second seating surface 274 spaced from the first seating surface 272. The body 270 includes a lower body portion or first outer surface 276 sized to fit closely within the lower cage portion 236 so that the lower body portion 276 of the closure member 216 can slide within the bore 240 of the lower cage portion 236. The lower body portion 276 of the closure member 216 can slide within the lower cage portion 236 between the closed position, in which the closure member 216 obstructs the openings 232 of the cage 214, and the open position, in which the closure member 216 is clear of (i.e., does not block) at least a portion of the openings 232.

Additionally, in this example, the closure member 216 includes a second body portion or second outer surface 278 having a diameter that is larger than a diameter of the lower body portion 276 to form the second seating surface 274. The second body portion 278 is sized to closely fit within the bore 238 of the upper cage portion 234 so that the second seating surface 274 of the closure member 216 can slide within the upper cage portion 234. Additionally, in such configuration, any portion of the second body portion 278 (i.e., the second seating surface 274) can engage the seal 268 when the valve 100 is in the closed position. Thus, the closure member 216 (e.g., the first seating surface 272 relative to the second body portion 274) may be formed in accordance with relaxed tolerances and does not require a high degree of dimension control, thereby significantly reducing the complexity and cost of the closure member 216, the upper cage portion 234, the lower cage portion 236, and/or the retainer 266. In this example, the closure member 216 includes tapered or angled surfaces 280 and 282 to facilitate or allow relatively gradual engagement of the seal assembly 220 with the closure member 216.

In operation, the actuator (e.g., a pneumatic actuator) receives a control fluid (e.g., air) to drive the valve stem 212 and, thus, the closure member 216 between the closed position at which the first seating surface 272 of the closure member 216 is in sealing engagement with the valve seat 218 (e.g., a seat ring) to restrict or prevent fluid flow through the passageway 206 of the valve 200 and the fully open or maximum flow rate position at which the first seating surface 272 of the closure member 216 is spaced away from the valve seat 218 to allow fluid flow through the valve 200.

In the open position, fluid flows between the inlet 208, through the opening 232 of the cage 214, an opening 284 of the valve seat 218, and through the outlet 210. As the closure member 216 traverses within the cage 214, the sealing ring 264 reduces leakage between the closure member 216 and the cage 214. Also, the tapered surface 280 engages the seal 268 to facilitate or provide a relatively gradual engagement of the seal 268 when the valve moves toward the valve seat 218 (e.g., in a downward direction in the orientation of FIG. 2A). The closure member 216 may include a tapered surface 282 to allow for gradual engagement of the plug with the C-seal 268 during installation or assembly of the valve trim apparatus 202 with the valve body 204

In the closed position, the closure member 216 covers or blocks the opening 232 of the cage 214 and sealingly engages the valve seat 218 via the first seating surface 272 to prevent fluid flow between the inlet 208 and the outlet 210. In the closed position, the second seating surface 274 of the closure member 216 also sealingly engages the seal 268 to provide a tight seal between the cage 214 and the closure member 216. Although the closure member 216 fit closely within the bore 240 of the lower cage portion 236, fluid may leak through a gap formed between the closure member 216 and the cage 214. For example, when the valve 200 is in the closed position, fluid from the inlet 208 may have a pressure that pushes against the body portion 270 of the closure member 216 and may flow (e.g., via the gap) between the closure member 216 and the cage 214 to the outlet 210 of the valve 200. Such unwanted leakage may affect the shut-off classification of the valve 200. For example, the American National Standards Institute has established various leakage classifications (e.g., Class I, II, III, etc.) relating to the amount of fluid flow allowed to pass through a valve when the valve is in a closed position. The seal assembly 220 is disposed between the cage 214 and the closure member 216 to prevent leakage between the inlet 208 and the outlet 210 of the valve 200 when the closure member 216 is in the closed position. The seal assembly 220 can achieve a reliable, tight shut-off at process fluid temperatures greater than 600° F., thereby improving the shut-off classification of the valve 200. For example, the example valve trim assembly 202 can provide class V shut-off classification per the American National Standards Institute classification system.

Other seal assemblies may be used to provide a seal between the closure member 216 and the cage 214. For example, the example seal assembly 220 can include other types of seal assemblies having different seals and/or shapes. Likewise, the cage 214 (e.g., the second end 244 of the upper cage portion 234 and the first end 248 of the lower cage portion 236) may be configured to receive other types of seal assemblies.

FIG. 3 illustrates another example cage 300 and seal assembly 302 that can be used to implement the example valve 200 of FIGS. 2A, 2B, and 2C. Similar to the seal assembly 220, the seal assembly 302 includes a sealing ring 304, a retainer 306, and a seal 308 (e.g., a C-seal). The cage 300 has an upper cage portion 310 and a lower cage portion 312. The lower cage portion 312 includes stepped surfaces 314a and 314b that matably engage with stepped surfaces 316a and 316b of the upper cage portion 310 to facilitate alignment of the upper and lower cage portions 310 and 312 when the upper and lower cage portions 310 and 312 are coupled together. Additionally, the upper cage portion 310 includes stepped surfaces 318a and 318b and the lower cage portion 312 includes stepped surfaces 320a and 320b that form a plurality of glands that receive the seal 308, the retainer 306, and the sealing ring 304 when the upper and lower cage portions 310 and 312 are coupled together. In this example, the sealing ring 304 is an elongate member that is larger or longer than, for example, the sealing ring 264 of FIGS. 2A, 2B, and 2C. The retainer 306 has an L-shaped cross-sectional shape.

The sealing ring 304 engages the stepped surface 320a of the lower cage portion 312 and the retainer 306 engages the stepped surface 320b of the lower cage portion 312 and a portion of the stepped surface 318b of the upper cage portion 310. The seal 308 is disposed between the gland formed by the stepped surface 318a of the upper cage portion 310 and the retainer 306. Thus, in this example, the sealing ring 304 is disposed between the retainer 306 and the stepped surface 320a and the seal 308 is disposed between the retainer 306 and the stepped surface 318a.

In operation, the sealing ring 304 engages the closure member 216 (e.g., the lower body portion 276) to help prevent leakage between the cage 300 and the closure member 216. The sealing ring 304 maintains closure member/cage leakage performance while the closure member 216 is spaced away from the valve seat 218 as the closure member 216 throttles fluid through the valve 200. In the closed position, the second body portion 278 of the closure member 216 engages the seal 308 to prevent fluid leakage between the cage 300 and the closure member 216. Any portion of the second body portion 278 of the closure member 216 may engage the seal 308 when the closure member 216 is in the closed position. Thus, the closure member 216 (e.g., the first seating surface 272 relative to the second body portion 274) may be formed in accordance with relaxed tolerances and does not require a high degree of dimension control, thereby significantly reducing the complexity and cost of the closure member 216, the upper cage portion 310, the lower cage portion 312, and/or the retainer 306. In this example, the closure member 216 includes tapered or angled surfaces 280 and 282 to facilitate or allow relatively gradual engagement of the seal assembly 220 with the closure member 216.

In this example, the orientation of the seal 308 is opposite or reversed from the orientation of the seal 268 of FIGS. 2A, 2B, and 2C to seal against a fluid flowing in an opposite or reversed direction from the fluid flow direction of FIGS. 2A, 2B, and 2C.

Figure 4:
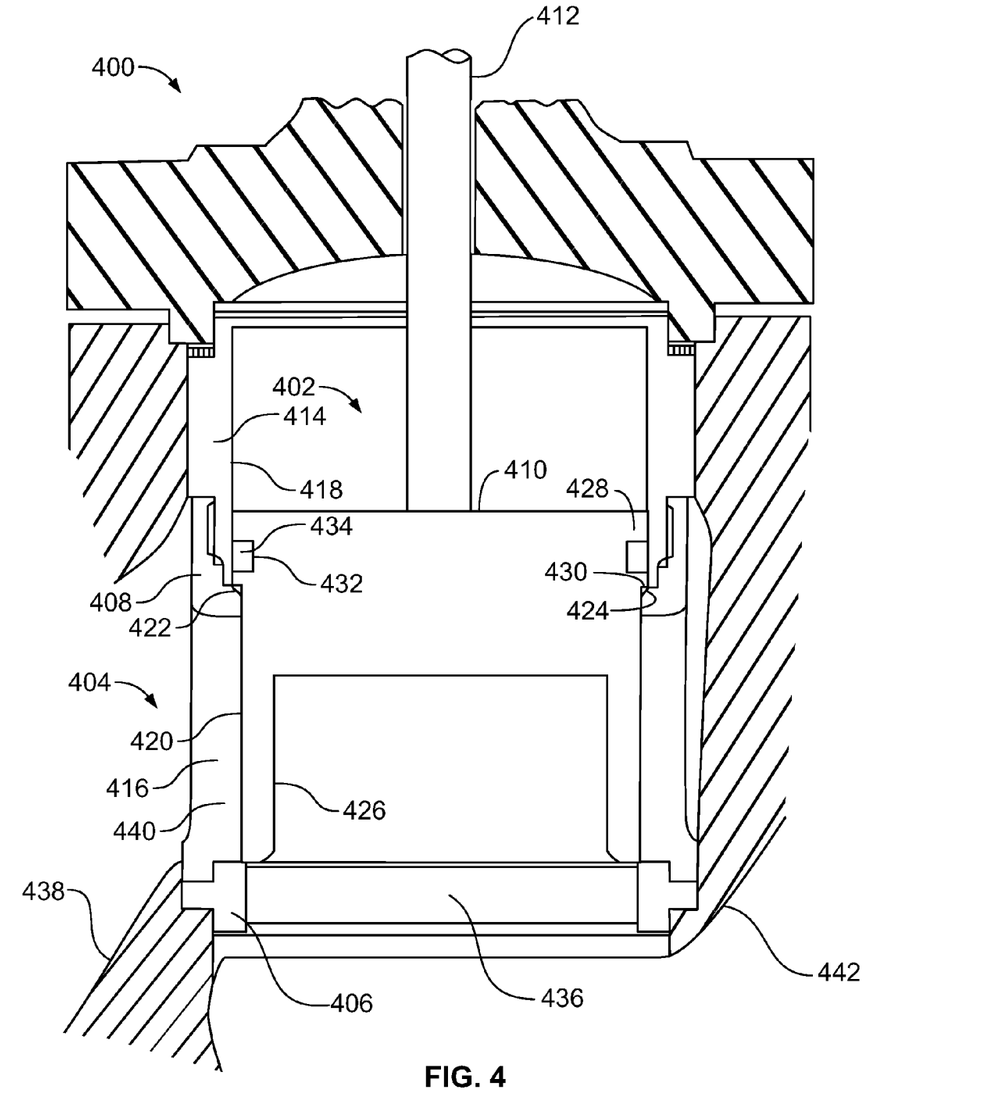
FIG. 4 illustrates an enlarged portion of a valve implemented with another example valve trim apparatus described herein.

FIG. 4 illustrates an enlarged portion of an example valve 400 that is implemented with another example valve trim assembly 402 described herein. The example valve trim assembly 402 of FIG. 4 includes a cage 404, a first or primary valve seat 406, a second or secondary valve seat 408, a closure member or valve plug 410, and a valve stem 412. The cage 404 includes a first portion or upper cage portion 414 and a second portion or lower cage portion 416. The cage 404 guides the valve plug 410 and provides lateral stability as the valve plug 410 travels between an open position and a closed position, thereby reducing vibrations and other mechanical stress. In this example, the upper cage portion 414 includes a bore 418 having a diameter that is larger than a diameter of a bore 420 of the lower cage portion 416.

The secondary valve seat 408 is captured or disposed between the upper and lower cage portions 414 and 416. The secondary valve seat 408 includes a sealing surface 422 to be engaged by the valve plug 410 to prevent unwanted leakage between the cage 404 and the valve plug 410 when the valve plug 410 is in the closed position (e.g., when the valve plug 410 engages the primary valve seat 406). In the illustrated example, the sealing surface 422 includes a tapered, curved or beveled edge or surface 424. In this example, the secondary valve seat 408 is made of a first material that is different than the material of the upper cage portion 414 and/or lower the cage portion 416. For example, the secondary valve seat 408 may be made of a fluoropolymer material (e.g., Teflon®) and the lower cage portion 416 may be made of, for example, a stainless steel material. The secondary valve seat 408 may be coupled to the lower cage portion 416 member via, for example, welding, fasteners (e.g., chemical fasteners), or any other suitable manufacturing process(es). In other examples, the secondary valve seat 408 may be formed via, for example, machining. For example, a block material may be coupled to the lower cage portion 416 and the block of material may be machined to form the secondary valve seat 408. In yet other examples, the secondary valve seat 408 may be made of, for example, an elastomeric material that is captured or disposed between the upper cage portion 414 and the lower cage portion 416. In yet other examples, the secondary valve seat 408 may be made of the same material as the upper cage portion 414 and/or the lower cage portion 416.

In this example, the valve plug 410 (e.g., a balanced valve plug, an unbalanced valve plug, etc.) includes a cylindrical body 426 and a head portion 428. The head portion 428 has a diameter that is larger than a diameter of the body 426. The body 426 is sized to fit closely within the bore 420 of the lower cage portion 416 and the head portion 428 is sized to fit closely within the bore 418 of the upper cage portion 414. The head portion 428 forms a shoulder or seating surface 430 (e.g., an enlarged sealing surface) that is to engage the sealing surface 422 of the secondary valve seat 408 when the valve plug 410 is in the closed position. As shown, the valve plug 410 includes an annular groove 432 to receive a gasket seal 434 to provide stability and reduce vibrations to the valve plug 410 during operation. The valve stem 412 couples the valve plug 410 to an actuator (not shown).

In operation, the actuator (e.g., a pneumatic actuator) drives the valve stem 412 and, thus, the valve plug 410 between the closed position at which the valve plug 410 is in sealing engagement with the primary valve seat 406 (e.g., a seat ring) to restrict or prevent fluid flow through an orifice 436 of the valve 400 and the fully open or maximum flow rate position at which the valve plug 410 is spaced away from the primary valve seat 406 to allow fluid flow through the valve 400. In the open position, fluid flows between an inlet 438, through an opening 440 of the cage 404, to an outlet 442. In the closed position, the valve plug 410 covers the opening 440 of the cage 404 and sealingly engages the primary valve seat 406 to prevent fluid flow between the inlet 438 and the outlet 442.

In the closed position, the seating surface 430 (e.g., the enlarged sealing surface) of the valve plug 410 also engages the sealing surface 422 of the secondary valve seat 408 to prevent fluid leakage between the valve plug 410 and the cage 404 when the valve 400 is in the closed position (i.e., when the valve plug 410 sealingly engages the primary valve seat 406). Thus, the secondary valve seat 408 prevents leakage between the inlet 438 and the outlet 442 of the valve 400 when the valve plug 410 is in the closed position, thereby improving the shut-off classification of the valve 400. For example, the example valve trim assembly 402 can provide class V shut-off classification per the American National Standards Institute classification system. Additionally, the example valve trim assembly 402 does not include a seal (e.g., a C-seal) that is dependent on a pressure differential of the process fluid to pressure assist the seal against a sealing surface. Instead, the valve trim assembly 402 employs the secondary valve seat 408 to provide a tight seal between the cage 404 and the valve plug 410 when the valve 400 is in the closed position.

Although not shown, the example valve trim assembly 402 may include a sealing ring (e.g., the sealing ring 264 of FIG. 2B, the sealing ring 304 of FIG. 3) and/or a retainer (e.g., the retainer 266 of FIGS. 2A-2C, the retainer 306 of FIG. 3) disposed adjacent the secondary valve seat along or coupled to the upper cage portion 414 and/or lower cage portion 416.

Although certain apparatus and articles of manufacture have been described herein, the scope of coverage of this patent is not limited thereto. To the contrary, this patent covers all apparatus fairly falling within the scope of the appended claims either literally or under the doctrine of equivalents.

What is claimed is:

1. A valve trim apparatus for use with valves, comprising:
    a cage having an upper portion removably coupled to a lower portion;
    a closure member disposed within the cage, the closure member having a first seating surface formed by a first portion of the closure member adjacent a first end of the closure member and a second seating surface formed by a second portion of the closure member adjacent a second end of the closure member opposite the first end, wherein the first portion is larger than the second portion, and wherein the first and second seating surfaces are integrally formed with the closure member, the closure member having a first angled surface adjacent a first end of the first seating surface and a second angled surface adjacent a second end of the first seating surface opposite the first end; and
    a seal assembly fixed between the upper and lower portions of the cage, the seal assembly to sealingly engage the first seating surface when the closure member is in a closed position to prevent leakage between the closure member and the cage, the first and second angled surfaces to facilitate gradual engagement of the first seating surface with the seal assembly when the closure member moves between the open and closed positions.

2. A valve trim apparatus as defined in claim 1, wherein the valve trim assembly further comprises a first valve seat disposed within an orifice of the valve, wherein the second seating surface of the closure member is to engage the first valve seat to prevent fluid flow between an inlet and an outlet of the valve when the valve is in the closed position.

3. A valve trim apparatus as defined in claim 2, wherein the second portion of the closure member is sized to closely fit within a first bore of the lower portion of the cage and the first portion is sized to closely fit within a second bore of the upper portion of the cage.

4. A valve trim apparatus as defined in claim 3, wherein the second bore of the upper portion of the cage has a diameter that is larger than a diameter of the first bore of the lower portion of the cage.

5. A valve trim apparatus as defined in claim 2, further comprising a second valve seat disposed between the upper portion and lower portion of the cage, wherein the seal assembly defines the second valve seat, and wherein the first seating surface of the closure member is to engage the second valve seat when the closure member is in the closed position.

6. A valve trim apparatus as defined in claim 5, wherein the second valve seat is coupled to an end of the lower portion of the cage via welding.

7. A valve trim apparatus as defined in claim 5, wherein the second valve seat is integrally formed with an end of the lower portion of the cage via machining.

8. A valve trim apparatus as defined in claim 5, wherein the second valve seat comprises a third material different from a first material of the upper portion of the cage and a second material of the lower portion of the cage.

9. A valve trim apparatus as defined in claim 5, wherein the second valve seat comprises a metallic material, a fluoropolymer material, or an elastomeric material.

10. A valve trim apparatus as defined in claim 1, wherein the first portion of the closure member has a diameter that is larger than a diameter of the second portion of the closure member.

11. A valve trim apparatus as defined in claim 1, wherein the first portion is sized such that any portion of the first seating surface sealingly engages the seal assembly when the closure member is in the closed position.

12. A valve trim apparatus as defined in claim 1, wherein the upper cage is made of a first material and the lower cage is made of a second material.

13. A valve trim apparatus as defined in claim 12, wherein the first material is different from the second material.

14. A valve trim apparatus as defined in claim 1, wherein the seal assembly comprises a seal, a retainer, and a sealing ring, wherein the retainer is to retain the sealing ring and the seal as the closure member traverses between an open position and the closed position.

15. A valve trim apparatus as defined in claim 14, wherein the seal comprises a C-seal.

16. A valve trim apparatus as defined in claim 1, wherein the seal assembly is disposed within glands formed by the upper and lower cage portions.

17. The valve trim apparatus as defined in claim 1, wherein the second angled surface is formed between the second portion of the closure member and the first portion.

* * * * *